United States Patent
Mujumdar et al.

(10) Patent No.: US 11,790,099 B1
(45) Date of Patent: Oct. 17, 2023

(54) POLICY ENFORCEMENT FOR DATASET ACCESS IN DISTRIBUTED COMPUTING ENVIRONMENT

(71) Applicant: BlueTalon, Inc., Redwood City, WA (US)

(72) Inventors: Prasad Mujumdar, Fremont, CA (US); Pratik Verma, Hopkins, MN (US); Shyam Desirazu, Foster City, CA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 762 days.

(21) Appl. No.: 15/893,558

(22) Filed: Feb. 9, 2018

(51) Int. Cl.
*G06F 21/62* (2013.01)
*H04L 9/40* (2022.01)
*H04L 67/10* (2022.01)

(52) U.S. Cl.
CPC ........... *G06F 21/6218* (2013.01); *H04L 63/20* (2013.01); *H04L 67/10* (2013.01)

(58) Field of Classification Search
CPC ....... G06F 21/6218; H04L 63/20; H04L 67/10
See application file for complete search history.

(56) References Cited

U.S. PATENT DOCUMENTS

| | | | |
|---|---|---|---|
| 5,537,548 A | | 7/1996 | Fin et al. |
| 5,944,824 A * | | 8/1999 | He .................. G06F 21/33 726/6 |
| 6,381,604 B1* | | 4/2002 | Caughran et al. ..... G06Q 10/10 |
| 6,463,470 B1 | | 10/2002 | Mohaban et al. |
| 6,687,229 B1 | | 2/2004 | Kataria et al. |
| 7,278,155 B2* | | 10/2007 | Hsieh et al. ........... G06F 21/41 713/186 |
| 7,542,943 B2 | | 6/2009 | Caplan et al. |
| 7,631,084 B2 | | 12/2009 | Thomas et al. |
| 7,730,089 B2 | | 6/2010 | Campbell et al. |
| 8,181,221 B2 | | 5/2012 | Manickam et al. |
| 8,613,108 B1 | | 12/2013 | Aggarwal |
| 8,677,447 B1 | | 3/2014 | Zuk et al. |
| 9,071,594 B2 | | 6/2015 | Boulos et al. |
| 9,224,006 B1* | | 12/2015 | Firestone ............... G06F 21/31 |
| 9,866,592 B2 | | 1/2018 | Arumugam et al. |
| 9,871,825 B2 | | 1/2018 | Arumugam et al. |

(Continued)

FOREIGN PATENT DOCUMENTS

CA     3015644 A1*  2/2019 ............. G06F 16/901

OTHER PUBLICATIONS

International Application No. PCT/US2016/054107, Notification of Transmittal of the International Search Report and the Written Opinion of the International Searching Authority, dated Jan. 9, 2017, 13 pages.

(Continued)

*Primary Examiner* — Christopher A Revak
(74) *Attorney, Agent, or Firm* — Weaver IP L.L.C.

(57) ABSTRACT

Techniques for improving data security and access control at the distributed execution level of distributed computing systems are provided. The techniques can include receiving a data access request from a data processing application to access data, directing the data access request to a security data application, modifying the data access request, executing the modified data access request to obtain data that is responsive to the modified data access request, and providing the obtained data to the data processing application.

20 Claims, 3 Drawing Sheets

(56) References Cited

U.S. PATENT DOCUMENTS

| | | | |
|---|---|---|---|
| 10,063,593 B2* | 8/2018 | Andrews et al. | H04L 63/10 |
| 10,152,522 B1* | 12/2018 | van Rotterdam et al. | H04L 63/102 |
| 10,430,430 B2* | 10/2019 | Muller et al. | G06F 16/284 |
| 2002/0007404 A1 | 1/2002 | Vange et al. | |
| 2002/0019828 A1 | 2/2002 | Mortl | |
| 2002/0169907 A1 | 11/2002 | Candea et al. | |
| 2003/0018786 A1 | 1/2003 | Lortz | |
| 2003/0021283 A1 | 1/2003 | See et al. | |
| 2003/0046315 A1 | 3/2003 | Feig | |
| 2003/0115322 A1 | 6/2003 | Moriconi et al. | |
| 2004/0054791 A1 | 3/2004 | Chakraborty et al. | |
| 2004/0073668 A1 | 4/2004 | Bhat et al. | |
| 2004/0088560 A1 | 5/2004 | Danks | |
| 2005/0021978 A1 | 1/2005 | Bhat et al. | |
| 2005/0091212 A1 | 4/2005 | Mohamed et al. | |
| 2006/0053216 A1 | 3/2006 | Deokar et al. | |
| 2007/0124797 A1 | 5/2007 | Gupta et al. | |
| 2007/0174831 A1 | 7/2007 | Lee et al. | |
| 2007/0234408 A1 | 10/2007 | Burch et al. | |
| 2008/0133479 A1* | 6/2008 | Zelevinsky et al. | G06F 16/3325 |
| 2008/0301437 A1 | 12/2008 | Chevallier et al. | |
| 2009/0049512 A1 | 2/2009 | Manickam et al. | |
| 2010/0024019 A1 | 1/2010 | Backlund | |
| 2010/0235396 A1 | 9/2010 | Chaurasia et al. | |
| 2010/0281524 A1 | 11/2010 | Ghittino et al. | |
| 2011/0209194 A1 | 8/2011 | Kennedy | |
| 2012/0166285 A1* | 6/2012 | Shapiro et al. | G06Q 30/0261 705/14.66 |
| 2012/0198467 A1 | 8/2012 | Jackson | |
| 2013/0332982 A1 | 12/2013 | Rao et al. | |
| 2014/0068699 A1 | 3/2014 | Balacheff et al. | |
| 2014/0090085 A1 | 3/2014 | Mattsson et al. | |
| 2014/0128053 A1 | 5/2014 | Merchant | |
| 2014/0196115 A1 | 7/2014 | Pelykh | |
| 2014/0351573 A1 | 11/2014 | Martini | |
| 2015/0113010 A1 | 4/2015 | Muthyala et al. | |
| 2015/0128205 A1 | 5/2015 | Mahaffey et al. | |
| 2015/0248560 A1* | 9/2015 | Pathak | G06F 21/6218 726/26 |
| 2016/0085962 A1 | 3/2016 | Sokolov et al. | |
| 2016/0119349 A1 | 4/2016 | Wang et al. | |
| 2016/0149859 A1 | 5/2016 | Curtis et al. | |
| 2016/0205101 A1 | 7/2016 | Verma et al. | |
| 2016/0342803 A1 | 11/2016 | Goodridge et al. | |
| 2017/0012962 A1 | 1/2017 | Lissack et al. | |
| 2017/0093925 A1 | 3/2017 | Sheretov et al. | |
| 2017/0208033 A1 | 7/2017 | Roskind et al. | |
| 2018/0032606 A1* | 2/2018 | Tolman et al. | G06F 16/951 |
| 2018/0131726 A1 | 5/2018 | Arumugam et al. | |
| 2018/0131727 A1 | 5/2018 | Arumugam et al. | |

OTHER PUBLICATIONS

International Application No. PCT/US2016/065853, Notification of Transmittal of the International Search Report and the Written Opinion of the International Searching Authority, dated Mar. 24, 2017, 14 pages.

PCT International Search Report in International Application No. PCT/US2018/017698, dated May 21, 2018, 3 pages.

* cited by examiner

POLICY ENFORCEMENT FOR DATASET ACCESS IN DISTRIBUTED COMPUTING ENVIRONMENT

BACKGROUND

Big data technologies manage distributed storage and distributed processing of large data sets on clusters of many computer nodes, in a distributed computing environment. These technologies allow users to access data in distributed file systems, e.g., Hadoop Distributed File System (HDFS), or a distributed databases, e.g., Hive or Hbase. However, not every user should have access to all data. Authorization rules and policies support precise data provisioning, specifying each user's access rights to data and ensuring users only receive the data to which they are entitled.

SUMMARY

In general, this specification relates to data security and access control at the distributed computing level of a distributed computing system.

Systems, computer program products and methods implementing access control on a distributed file system are described.

In general, one innovative aspect of the subject matter described in this specification can be embodied in methods that include enforcing data security and access control at the distributed computing level of a distributed computing system. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination.

A data access request may be received from a data processing application executing in a distributed execution framework. The data access request may be associated with a particular user. The data access request may be directed to a security data application executing in the distributed execution framework. The security data application may then modify the data access request and execute the modified data access request to obtain data that is responsive to the modified data access request. The obtained data may then be provided to the data processing application.

Modifying the data access request may include: retrieving, by the security data application, at least one data policy or rule for the particular user that specifies the user's access to the requested data; and modifying the data access request based on the at least one data access policy or rule for the particular user.

Retrieving the at least one data policy or rule for the particular user may include requesting data provisioning rules and policies for the particular user from a policy engine.

The policy engine may be embedded in the distributed execution framework. Alternatively, the policy engine may be external to the distributed execution framework.

Direct data access requests associated with data processing application users may be blocked.

A data access method of the data processing application may call a data access method of the security data application to make the data access request. The data access method of the data processing application may call the data access method of the security data application using a direct application programming interface method. The data access method of the security data application may override the data access method of the data processing application so that the data access method of the data processing application implicitly calls the data access method of the security data application.

Executing the modified data access request to obtain data that is responsive to the modified data access request may include sending the modified request to a distributed database or file system and obtaining data from the distributed database or file system that match criteria of the modified data access request.

The security data application may generate executor processes to store the obtained data and stored the obtained data in the generated executor processes.

Providing the obtained data to the data processing application may include providing the data processing application with a location of the generated executor processes storing the obtained data.

In response to a request from the data processing application, obtained data may be transferred from the generated executor processes to executor processes of the data processing application.

A second data access request may be received from a second data processing application executing in the distributed execution framework. The second data access request may be associated with a second particular user. The second data access request may be directed to the security application executing in the distributed execution framework to obtain data access.

Particular embodiments of the subject matter described in this specification can be implemented to realize one or more of the following example advantages. The distributed computing system improves data security by ensuring fine-grained security rules and policies when provisioning data for access. In an example implementation, the distributed computing system includes a distributed execution manager, e.g., YARN, that launches a security data application inside a distributed execution framework, e.g., SPARK. This security data application imposes data level security for each data access request from data processing applications executing inside the framework. The security data application can use a policy engine that stores rules and policies for data access when handling data provisioning.

Traditionally, when a client requests a task from a distributed computing environment, a distributed execution manager starts a data processing application inside a distributed execution framework. This data processing application may access data from a distributed file system or distributed database. However, fine-grained data security cannot be guaranteed within the distributed execution framework because the data processing application may not know about or access the policy engine prior to accessing the data. The data processing application may even override data access rules within the application. In addition, modification of the data processing application to incorporate a policy engine may be impractical. Furthermore, in conventional systems, application code making requests for data access within the distributed execution framework cannot be intercepted and modified prior to the requests being sent to the data layer in order to ensure that the requests comply with data provisioning rules and policies.

The distributed computing system improves data security by denying all access to the distributed file system or distributed database to the data processing applications, and allowing only the security data application, which enforces rules and policies of the policy engine, to access the data.

Additionally, the distributed computing system provides an application program interface that can be injected into data processing application code so that the data processing application code does not have to be rewritten to call the security data application for data access.

The distributed computing system also improves computational speed and computational load at the distributed computing level by ensuring that a data processing application executing in the distributed execution framework retrieves only the data that is authorized for a user to access. Furthermore, the distributed computing system eliminates the need for the data processing application running in the distributed execution framework to check the user permissions and modify the received data. The distributed computing system also reduces the network traffic between the distributed computing level and the data level by checking data access rules and policies prior to requesting data. The system then sends, from the data level to the distributed computing level, only the data that matches the access rules.

The details of one or more embodiments of the subject matter of this specification are set forth in the accompanying drawings and the description below. Other features, aspects and advantages of the subject matter will become apparent from the description, the drawings and the claims.

DETAILED DESCRIPTION

Like reference numbers and designations in the various drawings indicate like elements.

A distributed computing system can execute data processing applications that are computationally-intensive and require processing large volumes of data. An example of a distributed computing system is an Apache® Hadoop® based system that includes one or more clusters. An Apache Hadoop cluster, or simply, a Hadoop cluster, includes one or more computers designated as nodes. Various tools can be implemented to manage nodes and resources in a Hadoop cluster. The distributed computing system can include a distributed execution framework, e.g., Apache SPARK, that runs on a distributed execution manager, e.g., YARN. The distributed execution framework is a data processing engine with development application programming interfaces. The application creates multiple tasks which can be executed in parallel on multiple machines. Each task operates on a partition of data. The results of a task can be fed to a subsequent task for further computation.

YARN (Yet Another Resource Negotiator) is an example tool that manages a cluster. A YARN resource manager can be accessed through a Representational State Transfer (REST) application programming interface (API), e.g., through an HTTP (Hypertext Transfer Protocol) or HTTPS (HTTP Secure) request. Through the YARN REST API, a client device can manage a Hadoop cluster, including, for example, get cluster information, obtain resources in the cluster, retrieve application objects, and so on. The distributed execution manager decouples resource management from job scheduling and monitoring.

In the distributed computing system there is a global resource manager that manages resources and a per-application application master that schedules and monitors jobs of applications. The distributed execution framework of the distributed computing system includes an application master to manage a data processing application, which is a developer-created application that in part processes data. The application master and a cluster of computing nodes (referred to as "executors") together perform the workload of the data processing application. The workload can be divided into tasks by the application master and be assigned to one or more of the executors. To perform the tasks, the application master can request and fetch data from a distributed file system (for example, a Hadoop Distributed File System (HDFS)) in a cloud environment and provide the data to the executors for further processing. The distributed file system may have a master that indicates where the requested data is located within the distributed file system. For example, the master knows where the data has been stored within the files, the frames, or the tables of the distributed file system.

Figure 1:
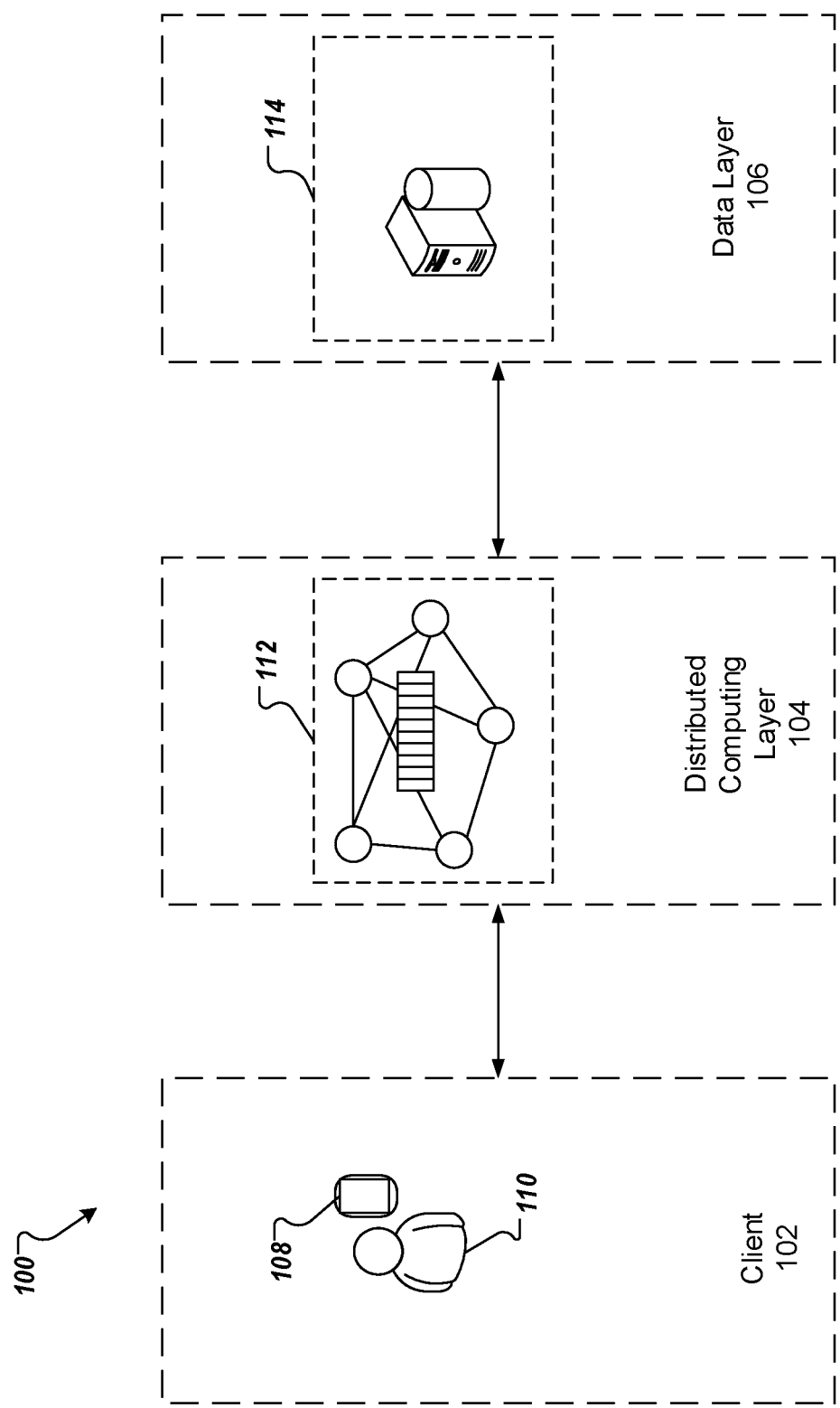
FIG. 1 is a block diagram illustrating an example distributed computing system.

FIG. 1 is a block diagram illustrating an example distributed computing system 100. As illustrated, the system 100 includes a client layer 102, a distributed computing layer 104 (including e.g., a distributed execution manager and a distributed execution framework 112), and a data layer 106 (including a distributed database or distributed file system). The client layer can include one or more client devices 108 that are used by one or more clients 110. A client device can request a process to be performed by a data processing application executing in the distributed computing layer 104 (e.g., in the distributed execution framework 112). The distributed computing layer 104 connected to one or more distributed databases or file systems 114 on the data layer 106 to retrieve data for the data processing application.

In some cases, there can be restrictions on the data processing application's authorization to access data. In some cases, the restrictions result from restrictions on a client's access to data. For example, for some clients, a data processing application may be restricted from receiving Social Security Numbers (SSN) or have authorization to see only the last four digits of the SSNs. One solution for these situations is to enforce data provisioning policies for the data processing application at the data level, e.g., by the distributed file system itself. Another solution, which is discussed in this disclosure, is to enforce access policies at the distributed computing level.

In an example context, client 110 can be a customer service operator who requests credit card account records for all customers of a particular department store for a particular time frame. The credit card account records may include sensitive data such as social security numbers (SSNs) and addresses of the customers. This data may be access-controlled and provisioned according to access-control policies. For example, an access control policy may indicate that the operator can receive no more than 4 last digits of SSNs. Thus, the distributed execution framework can mask the operator's request to create a request for the 4 last digits of SSNs. Similarly, an access control policy may indicate that the operator can access only the past three months addresses of the customer. Then, the distributed execution framework can filter out the operator's request that exceeds the past three months. The distributed execution framework fetches the data corresponding to the masked and filtered request (for example, from the data layer 106).

Implementations of the present disclosure provide a system that can modify a data request within a distributed execution framework based on one or more policies for the data processing application and submit the modified request for data to the distributed file system. A determination that the data request needs to be modified is performed at the distributed computing level, before sending the request for the data to a database or file system (where the data is stored).

The data request modification can be performed by applying one or more obligations (e.g., masking, filtering) corresponding to access control policies. For example, in a request for data on names, SSN, and telephone number of customers, data on the SSN may be masked or filtered such that only names and telephone numbers for particular dates are requested from the distributed file system or database.

Figure 2:
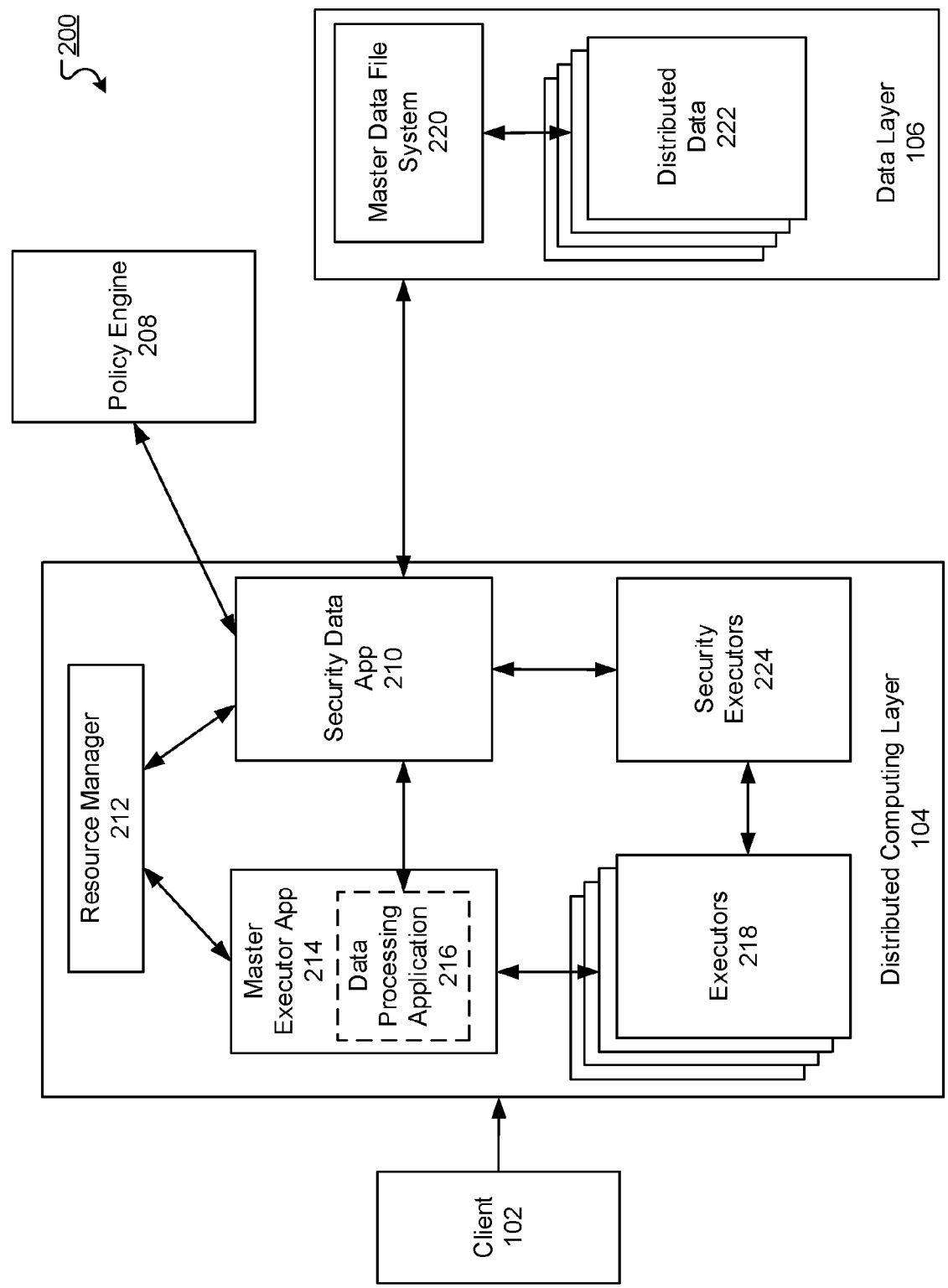
FIG. 2 depicts an example architecture for policy enforcement.

FIG. 2 depicts an example architecture 200 for policy enforcement for the example distributed computing system of FIG. 1. The distributed computing layer 104 of FIG. 2 includes a distributed resource manager 212 that is in communication with a security data application 210 and a master executor application 214. The distributed computing layer 104 also includes one or more executors such as executors 218 and security executors 224. The distributed computing layer 104 is in communication with a policy engine 208 through the security data application 210. The distributed computing layer 104 is in communication with the data layer 106 by the security data application 210. The data layer 106 can include a master data file system 220 and distributed data 222 files.

In some implementations, the resource manager 212 is responsible for starting execution of a workload in a distributed execution framework (e.g., 112) based on a request that is received from the client 102. In some examples, the resource manager 212 creates (e.g., as a SPARK job) a master executor application 214 in the distributed execution framework, for managing execution of the workload. The resource manager 212 can also launch (e.g., as another SPARK job) a security data application 210 in the distributed execution framework, for retrieving the data needed for execution of the workload. The security data application 210 can create or manage one or more results sets (e.g., Spark data frames). In some examples, one or more security executors 224 are also created to work with the security data application 210.

The distributed execution framework can perform parallel execution jobs. For example, parallel security data applications 210, or parallel data processing applications 216, or both, can be performed. Also, a single security data application 210 can perform multiple parallel data request modifications or communications with multiple data processing applications.

The master executor application 214 can divide the workload into tasks and distributes the tasks between the executors 218. The master executor application 214 can also monitor the liveliness and resource consumption of the executors 218.

The data processing application 216 can include application programming interface (API) calls that request data needed for performing the workload from the security data application 210. For instance, the data request can include all data that the client has requested in the workload. (The data request can be from an API call e.g., sqlContext( SELECT * FROM TABLE WHERE [Certain Parameters are met] ).

In some implementations, the data processing application is provided with a new security (API) that includes methods that can be called by the data processing application 216 code when making data access requests. These calls will be directed to the security data application 210 so that data access requests can be modified by the security data application 210 prior to accessing the distributed database or distributed file system. These calls can be made using transmission control protocol (TCP) and Internet Protocol (IP).

In other implementations, the data processing application may use the distribution executed framework API without change so that the data processing application code does not have to be rewritten to call the security data application 210 for data access. In these instances, for example, the new security API may include a method signature for data access that is the same as the data access call from the distributed execution framework API. Since the security API data access method has the same method signature as the distribution execution framework API data access method, the security API can be injected into the data processing application 216 code. This injection can be done by providing the security API to the data processing application 216 in a way that that the data processing application 216 receives the security API before the distributed execution framework API. Accordingly, the data processing application 216 finds the security API data access method first, overriding the original data processing application data access method call to the distributed execution framework API (that the data processing application 216 used to use to fetch data from the data layer 106). For example, a file, e.g., a java archive file (JAR), containing the security API may be included in the location, e.g., the classpath, of the classes and packages for the data processing application before the JAR containing the distributed execution API. In some examples, a wrapper library is provided to translate the original distributed execution framework API to the new security API for communicating with the security data application 210.

In some implementations, the security data application 210 can be in communication with the data processing application 216 over transmission control protocol (TCP), internet protocol (IP), or inter process communications, such as Unix pipes. The data request made by the data processing application 216 is received at the security data application 210. The security data application 210 modifies the data request based on one or more policies associated with the data processing application 216, and sends the modified data request to the data layer 106 to obtain the data that follows the policies.

The security data application 210 receives the policies from a policy engine 208. The policy engine 208 may be any component that allows data provisioning rules and policies to be created, stored, and accessed, e.g., the policy engine described in Patent Application No. 15,885,015, "Policy Enforcement For Search Engines" filed on Jan. 31, 2018. For example, the policy engine 208 may provide a list of the policies associated with the data processing application 216. The data processing application 216 may execute as a specific user (which may be in turn associated with the client, the client's request, the data, or a combination of these). The security data application 210 requests the data policies and rules for the specific user of the data processing application that are associated with the requested data. For example, if the data processing application 216 is being executed as user A and requests access to credit card information, the security data application 210 will request the data provisioning rules and policies of user A with respect to credit card information from the policy engine 208. In the depicted example architecture, the policy engine 208 is external to the distributed executor layer and the data layer. However, in other examples, the policy engine can be embedded into either of the distributed executor layer or the data layer. The policy engine 208 can include internal memories that store the policies, or can be in communication with external memories (for example, external databases) that provide the policies.

Modification of the data request based on the policies can be performed by one or more modules in the security data application 210. Each data request can have one or more search terms for querying the data layer. One module can modify the data request to include various conditions into the request that limit what data the data layer can retrieve. The module can, additionally or alternatively, negate particular search terms or add additional search terms to further refine parameters of the data request. The module may include logical filters e.g., operators "AND" and "NOT." In some implementations, the module may encrypt part of the data or encrypt with preserving format (e.g., a 16 digit credit card number encrypted as another 16 digit string). The module may zero out part of the data, or even skip a data record all together and not provide the record in the as part of the result set. In some implementations, a performing module is in charge of performing the modification on the data request. For example, the performing module can apply one or more obligations (e.g., masking, filtering, etc.) on the data request. Either or both of the computational and the performing modules can be embedded into the data security application 210, or can be implemented as a separate module that provides the computation or the performing services to the data security application 210. The security data application 210 can execute the original method from the distributed execution framework API for data access (that the computing layer 104 used to use for fetching data from the data layer 106 before implementation of the security data application 210) to submit requests to the data layer 106. In some implementations, the security data application 210 has privileges of a particular super user account when communicating with the data layer 106. An account having super user privileges can be an administrator account, a system root, or in case of UNIX or UNIX-like systems, an account having an account identifier of zero. The particular super user account may be specific to the security data application 210. In order to prevent the data processing application 216 from accessing data without going through the security data application 210, the distributed computing system may only accept data access requests from the particular super user account of the security data application 210 and deny all other access. Therefore, since the data processing application 216 does not know about or have access to the particular super user account, the data processing application will always be denied data access if the application requests data directly.

In some implementations, the security data application 210 sends the modified data request to the data layer 106 for data access, e.g., the security application 210 may make the request to a master data file system 220 in the data layer 106. For example, the security data application 210 may submit a query with masked data request to the master data file system 220. The master data file system 220 may include location of all data stored in the distributed data 222 systems of the data layer 106. In some examples, the master data file system 220 responds back information (e.g., location) of data corresponding to the modified data request, to the security data application 210.

The security data application 210 receives the data associated with the modified data request from the data layer 106. For example, the received data can be found in the data layer based on the information that the security data application 210 received from the master data file system 220. Accordingly, none of the data processing application 216, the master executor application 214, and the executors 218 is in direct contact with the data layer 106 through e.g., TCP/IP requests and responses.

In some implementations, the security data application 210 stores the received data in one or more security executors 224, and sends information (e.g., location) of the security executors 224 that have the stored data to the data processing application 216. The data processing application 216 can then inform the executors 218 about the information of the security executors 224. For example, the data processing application 216 can send the location of where the data is stored in the security executors 224 to the executors 218 that are in charge of performing the client's workload. The executors 218 can then retrieve the data from the security executors 224.

In some implementations, the security data application 210 sends the data received from the data layer 106 to the data processing application 216 and the data processing application 216 directs the data to the executors 218 that are in charge of performing the tasks. In some other implementations, the security data application 210 is in communication with the executors 218 and is able to send the data received from the data layer 106 directly to the executors 218. Accordingly, any data retrieval of the execution layer 104 (for performing the tasks of the data processing application) from the data layer 106 has to happen through the security data application 210.

Figure 3:
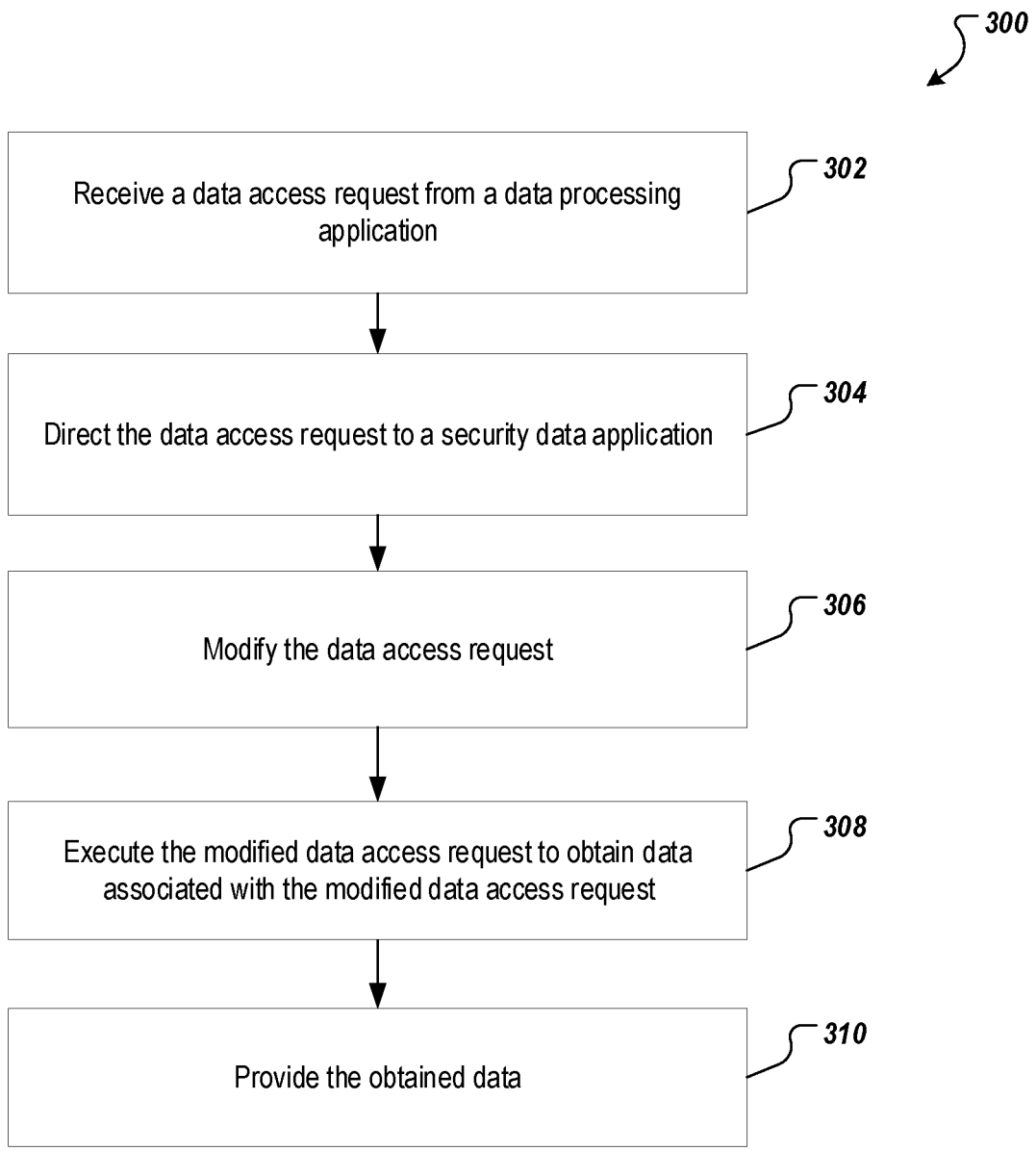
FIG. 3 is a flowchart of an example process of policy enforcement.

FIG. 3 is a flowchart of an example process 300 for policy enforcement for the example computing system of FIG. 1. The process 300 can be performed by a system that includes a distributed computing layer (e.g., that includes a distributed execution manager and a distributed execution framework as shown in FIG. 2), and a data layer (e.g., the distributed file system in the data layer 106 of FIG. 2). The data layer can include a HDFS and the distributed computing layer can include a distributed execution framework such as Apache SPARK that generates a data processing application and launches a security data application (for example, as a SPARK jobs) for executing a task (e.g., executing a request submitted by the client 102).

At 302, a data access request associated with a data processing application is received. In an example context, the data processing application 216 may send a query that requests access to credit card account records for customers of a department store, to the security data application 210. The credit card account records may include sensitive information such as SSNs of the customers.

At 304, the distributed execution framework directs the data access request to a security data application, e.g., security data application 210. For example, as described above, an application programming interface data access method call from the data processing application may be sent to a corresponding data access method of the security data application.

At 306, the data access request is modified based on the at least one data access policy. The security data application 210 retrieves the access policies from the policy engine 208. The access policies may indicate that only the last four digits of SSNs can be provided to the data processing application. The security data application 210 modifies the data request based on the access policies provided by the policy engine 208. In the example context, the security data application 210 masks the data request so that only four last digits of SSNs are requested (for example, by generating a query for only the last four digits of the SSNs).

At 308, the modified data access request is executed to obtain data associated with the modified data access request. For example, the security data application 210 sends the modified request to the data layer 106. The data layer 106 provides the data corresponding to the modified request (the four last digits of the SSNs in the example context) to the security data application 210.

At 310, the obtained data is provided, for example, to the data processing application. The security data application 210 can provide the data obtained from the data layer 106 to the data processing application 216, or can store the obtained data in security executors 224 and provide the location of the stored data to the data processing application 216.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A method for enforcing data access in a distributed execution framework, the method comprising:
   receiving a data access request from a data processing application executing in the distributed execution framework, the data access request associated with a particular user;
   directing the data access request to a security data application executing in the distributed execution framework;
   modifying, by the security data application, the data access request;
   executing, by the security data application, the modified data access request to obtain data that is responsive to the modified data access request;
   generating, by the security data application, executor processes to store the obtained data;
   storing the obtained data in the generated executor processes; and
   providing the obtained data and a location of the generated executor processes storing the obtained data to the data processing application.

2. The method of claim 1, wherein modifying the data access request comprises:
   retrieving, by the security data application, at least one data policy or rule for the particular user that specifies the user's access to the requested data; and
   modifying, by the security data application, the data access request based on the at least one data access policy or rule for the particular user.

3. The method of claim 2, wherein retrieving the at least one data policy or rule for the particular user comprises requesting data provisioning rules and policies for the particular user from a policy engine.

4. The method of claim 3, wherein the policy engine is embedded in the distributed execution framework.

5. The method of claim 3, wherein the policy engine is external to the distributed execution framework.

6. The method of claim 1, further comprising:
   blocking direct data access requests associated with data processing application users.

7. The method of claim 1, wherein a data access method of the data processing application calls a data access method of the security data application to make the data access request.

8. The method of claim 7, wherein the data access method of the data processing application calls the data access method of the security data application using a direct application programming interface method.

9. The method of claim 7, wherein the data access method of the security data application overrides the data access method of the data processing application so that the data access method of the data processing application implicitly calls the data access method of the security data application.

10. The method of claim 1, wherein executing, by the security data application, the modified data access request to obtain data that is responsive to the modified data access request comprises:
    sending the modified request to a distributed database or file system; and
    obtaining data from the distributed database or file system that match criteria of the modified data access request.

11. The method of claim 1, further comprising:
    in response to a request from the data processing application, transferring obtained data from the generated executor processes to executor processes of the data processing application.

12. The method of claim 1, further comprising:
    receiving a second data access request from a second data processing application executing in the distributed execution framework, the second data access request associated with a second particular user;
    directing the second data access request to the security data application executing in the distributed execution framework to obtain data access.

13. The one or more non-transitory computer-readable storage mediums of claim 1, wherein modifying the data access request comprises:
    retrieving, by the security data application, at least one data policy or rule for the particular user that specifies the user's access to the requested data; and
    modifying, by the security data application, the data access request based on the at least one data access policy or rule for the particular user.

14. A system comprising:
    one or more computers; and
    one or more storage devices storing instructions that are operable, when executed by the one or more computers, to cause the one or more computers to perform operations comprising:

receiving a data access request from a data processing application executing in a distributed execution framework, the data access request associated with a particular user;

directing the data access request to a security data application executing in the distributed execution framework;

modifying, by the security data application, the data access request;

executing, by the security data application, the modified data access request to obtain data that is responsive to the modified data access request;

generating, by the security data application, security executor processes to store the obtained data;

storing the obtained data in the generated security executor processes; and providing the obtained data and a location of the generated security executor processes storing the obtained data to the data processing application.

15. The system of claim 14 wherein modifying the data access request comprises:

retrieving, by the security data application, at least one data policy or rule for the particular user that specifies the user's access to the requested data; and modifying, by the security data application, the data access request based on the at least one data access policy or rule for the particular user.

16. The system of claim 15, wherein retrieving the at least one data policy or rule for the particular user comprises requesting data provisioning rules and policies for the particular user from a policy engine.

17. The system of claim 14, wherein executing, by the security data application, the modified data access request to obtain data that is responsive to the modified data access request comprises:

sending the modified request to a distributed database or file system; and obtaining data from the distributed database or file system that match criteria of the modified data access request.

18. The system of claim 14, wherein the operations further comprise:

in response to a request from the data processing application, transferring obtained data from the generated security executor processes to executor processes of the data processing application.

19. One or more non-transitory computer-readable storage mediums comprising instructions stored thereon that are executable by a processing device and upon such execution cause the processing device to perform operations comprising:

receiving a data access request from a data processing application executing in a distributed execution framework, the data access request associated with a particular user;

directing the data access request to a security data application executing in the distributed execution framework;

modifying, by the security data application, the data access request;

executing, by the security data application, the modified data access request to obtain data that is responsive to the modified data access request;

storing the obtained data in a security executor; and providing the obtained data and a location of the security executor storing the obtained data to the data processing application.

20. The one or more non-transitory computer-readable storage mediums of claim 19, wherein the operations further comprise:

in response to a request from the data processing application, transferring obtained data from the security executor to executor processes of the data processing application.

* * * * *